No. 874,434. PATENTED DEC. 24, 1907.
A. M. PORTTEUS.
ATTACHMENT FOR BAND SAWS.
APPLICATION FILED MAY 27, 1907.
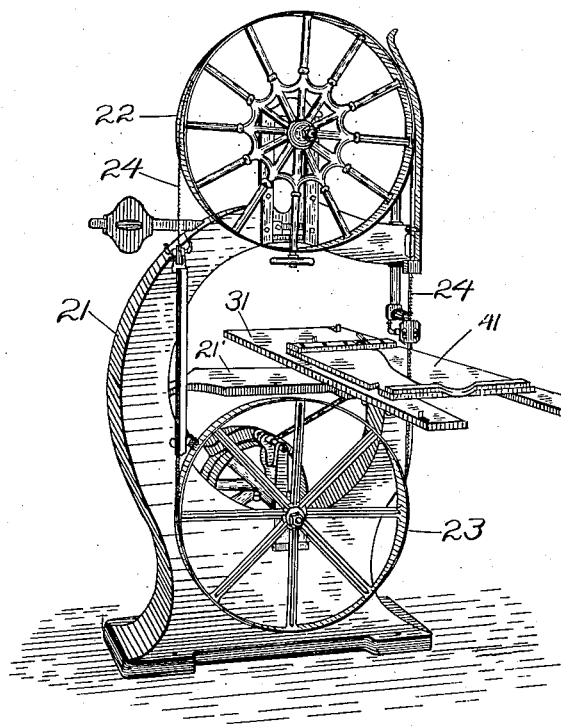
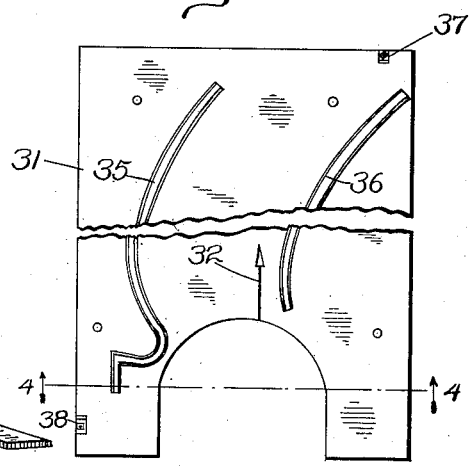
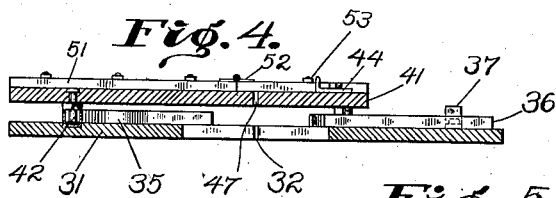
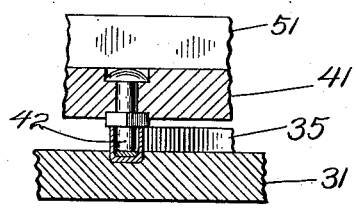
Witnesses
K. R. Clendening.
Thomas W. McMurs
Inventor
Albert M. Portteus.
By Bradford & Hood,
Attorneys

UNITED STATES PATENT OFFICE.

ALBERT M. PORTTEUS, OF INDIANAPOLIS, INDIANA, ASSIGNOR OF ONE-HALF TO PHILIP G. BASSO, OF INDIANAPOLIS, INDIANA.

ATTACHMENT FOR BAND-SAWS.

No. 874,434.   Specification of Letters Patent.   Patented Dec. 24, 1907.

Application filed May 27, 1907. Serial No. 375,953.

*To all whom it may concern:*

Be it known that I, ALBERT M. PORTTEUS, a citizen of the United States, residing at Indianapolis, in the county of Marion and State of Indiana, have invented certain new and useful Improvements in Attachments for Band-Saws, of which the following is a specification.

The object of my present invention is to provide an attachment for the tables of band saws by means of which irregular parts, such as chair rockers and the like, may be rapidly and accurately produced.

Said invention will be first fully described and the novel features thereof then pointed out in the claims.

Referring to the accompanying drawings, which are made a part hereof, and on which similar reference characters indicate similar parts, Figure 1 is a perspective view of a band saw provided with a table and attachments embodying my present invention; Fig. 2 a top or plan view of the bed plate or stationary portion of table of my improved device; Fig. 3 a similar view of the carriage or movable part of the device; Fig. 4 a transverse sectional view through the parts when assembled, at the point indicated by the dotted lines 4 4 in Figs. 2 and 3; and Fig. 5 a detail view similar to Fig. 4, but on an enlarged scale.

The frame 21, wheels 22 and 23, saw 24, and various attachments, are or may be of any usual or desired form or construction; and, not being a part of my present invention, will not be further described herein, except incidentally in describing said invention.

The bed plate 31 is rigidly attached to the member 21' of the frame 21 of the saw. While rigidly attached it is designed to be removable. A slit 32 is formed therein to enable it to pass over the saw in being removed and replaced, and also to enable the saw to be removed and replaced as occasion may require. Its front end is also cut away, as shown, to enable the operator to approach it more closely than he otherwise could. It carries upon its upper side curved guides or ways 35 and 36, with which suitable parts on the carriage will engage (as will be presently more fully described) whereby the carriage is given the proper movement to produce the desired result. Stops 37 and 38 limit the travel of the carriage.

The carriage 41 is mounted upon and travels over the bed plate 31 being provided with pins or projections 42 and 43, or equivalent parts, which engage with and are guided by the guides or ways 35 and 36 on said bed plate. Projections 44, 45 and 46 are provided, with which the stock is designed to be in contact while being sawed. A curved slit 47 runs through this carriage for the greater portion of its length, through which the saw passes during the sawing operation. A notch 48 in this carriage comes in contact with the stop 38 on the bed plate when the carriage is drawn back to its greatest extent. The other end contacts with the stop 37 when the carriage has been pushed forward to its greatest extent. The carriage is usually operated by a handle 49.

The form of guides or ways shown are those appropriate to the sawing of chair rockers. In sawing such rockers the operation may be stated as follows: The bed plate and carriage having been properly assembled and positioned with relation to the saw, a piece of suitable stock is laid on the carriage with its side properly positioned relatively to the slit 47 and the end nearest the operator resting against the stop 46. The operator then pushes the carriage forward and the appropriate form is produced. The piece sawed off is then taken away, the stock pushed over against the stops 44 and 45, and a second cut produces a rocker of the desired shape. This operation is continued until the piece of stock is entirely consumed.

It will be noticed that the pins or projections 42 and 43 are not only on opposite sides of the carriage but are positioned near the opposite ends of said carriage. That is, they are in diagonal relation to each other in respect to the general form of the carriage, and to its line of movement. This is necessary in order to permit of the required movements necessary to produce the irregular shape desired.

The carriage 41, as well as the bed plate 31, needs to be occasionally removed and replaced, or the saw inserted and removed. It is, however, necessary that the parts of the carriage bed on the opposite sides of the saw-slit 47 should be held rigidly relatively to each other. I have, therefore, provided a cross-bar 51, which is bolted or otherwise properly secured to the end of the carriage, and which extends across said saw-slit. In order, however, to enable the carriage and saw to be conveniently disassociated, that portion of this bar which crosses the saw-slit must be turned, or moved out of the way, from time to time. I have, therefore, made said bar in two parts, and have connected these parts by a hinge 52, and the shorter part is secured to the narrower part of the carriage bed by a single bolt 53. By removing said bolt this hinged part can be turned back, when the carriage and saw can be easily separated.

Having thus fully described my said invention, what I claim as new, and desire to secure by Letters Patent, is:—

1. The combination of a saw table provided with curved ways, and a carriage having projections which extend into and engage with said ways, and also provided with suitable stops against which the stock will rest while being sawed, and a curved slit through which the saw will pass corresponding to the shape of the desired finished article.

2. The combination of a saw table having irregular guides or ways, a carriage mounted thereon and having projections which engage with said ways, said projections being positioned toward opposite sides of said carriage and also toward opposite ends thereof.

3. The combination with a saw table having guides or ways thereon, of a carriage engaging with one of said ways near one end and with the other of said ways near the other end, the movements of the opposite ends of said carriage being thus guided by said two separate ways.

4. The combination of a saw table or bed plate having irregular guides or ways, of a carriage mounted thereon and having separate engaging points with said guides or ways, one of said engaging points being upon one side of a plane taken longitudinally of the carriage and also of a plane taken transversely of the carriage, and the other of said engaging points being upon the other side of each of said planes.

In witness whereof, I, have hereunto set my hand and seal at Indianapolis, Indiana, this twenty-fifth day of May, A. D. one thousand nine hundred and seven.

ALBERT M. PORTTEUS. [L. S.]

Witnesses:
CHESTER BRADFORD,
THOMAS W. MCMEANS.